US010660151B2

(12) United States Patent
Futaki

(10) Patent No.: US 10,660,151 B2
(45) Date of Patent: May 19, 2020

(54) RADIO TERMINAL, BASE STATION, AND METHOD THEREFOR

(71) Applicant: NEC CORPORATION, Tokyo (JP)

(72) Inventor: Hisashi Futaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 6 days.

(21) Appl. No.: 16/300,111

(22) PCT Filed: Jan. 5, 2017

(86) PCT No.: PCT/JP2017/000080
§ 371 (c)(1),
(2) Date: Nov. 9, 2018

(87) PCT Pub. No.: WO2017/195398
PCT Pub. Date: Nov. 16, 2017

(65) Prior Publication Data
US 2019/0150218 A1    May 16, 2019

(30) Foreign Application Priority Data
May 12, 2016    (JP) .................. 2016-096516

(51) Int. Cl.
*H04W 76/19*    (2018.01)
*H04W 4/70*    (2018.01)
(Continued)

(52) U.S. Cl.
CPC ............. *H04W 76/19* (2018.02); *H04W 4/70* (2018.02); *H04W 4/80* (2018.02); *H04W 76/27* (2018.02);
(Continued)

(58) Field of Classification Search
CPC ....... H04W 76/19; H04W 80/08; H04W 4/70; H04W 80/02; H04W 76/27; H04W 4/80; H04W 74/0833
See application file for complete search history.

(56) References Cited

U.S. PATENT DOCUMENTS

2013/0070611 A1*    3/2013  Ahn ................... H04W 52/286
                                                         370/241

OTHER PUBLICATIONS

"3rd Generation Partnership Project; Technical Specification Group Services and System Aspects; Architecture enhancements for Cellular Internet of Things (Release 13)", 3GPP TR 23.720 V1.2.0, Nov. 2015, 96 pages.
(Continued)

*Primary Examiner* — Vinncelas Louis
(74) *Attorney, Agent, or Firm* — Sughrue Mion, PLLC

(57) ABSTRACT

A radio terminal (1) determines (201) (a) a pathloss level between the radio terminal (1) and a base station (2), (b) a coverage enhancement level based on the pathloss level, or (c) a coverage enhancement mode configured in the radio terminal (1). The radio terminal chooses (202) between non-truncated first information and truncated first information, having a smaller bit length than the non-truncated first information, to be included in an initial uplink Radio Resource Control (RRC) message transmitted within a random access procedure, based on the determined pathloss level, the determined coverage enhancement level, or the determined coverage enhancement mode. This contributes to, for example, enabling a base station to easily know the Msg3 size desired by a radio terminal.

11 Claims, 10 Drawing Sheets

(51) Int. Cl.
*H04W 80/08* (2009.01)
*H04W 4/80* (2018.01)
*H04W 76/27* (2018.01)
*H04W 80/02* (2009.01)
*H04W 74/08* (2009.01)

(52) U.S. Cl.
CPC .......... *H04W 80/02* (2013.01); *H04W 80/08* (2013.01); *H04W 74/0833* (2013.01)

(56) References Cited

OTHER PUBLICATIONS

Huawei, Hisilicon, "Resume ID for non-NB-IoT UEs", 3GPP TSG-RAN WG2 Meeting #93bis, R2-162269, Apr. 11-15, 2016, Dubrovnik, Croatia, 3 pages.
"RRC Resume ID for non-NB-UEs", Ericsson, 3GPP TSG-RAN WG2 #93bis, Tdoc R2-162845, Apr. 11-15, 2016, Dubrovnik, Croatia, 4 pages.
International Search Report for PCT/JP2017/000080, dated Feb. 7, 2017.

\* cited by examiner

Resume-CE-LevelInfoList-r13 ::= SEQUENCE (SIZE (1..maxCE-Level-r13)) OF Resume-CE-LevelInfo-r13

Resume-CE-LevelInfo-r13 ::=   SEQUENCE {
    reportResumeIdentity-CE-r13  ENUMERATED {full, truncated}   OPTIONAL,   -- Need OR     501
}

Fig. 5

```
RACH-ConfigCommon ::=    SEQUENCE {
// removed
    ...,
    [[    preambleTransMax-CE-r13 PreambleTransMax              OPTIONAL,    -- Need OR
          rach-CE-LevelInfoList-r13   RACH-CE-LevelInfoList-r13  OPTIONAL    -- Need OR
    ]]
}
// removed RACH-CE-LevelInfoList-r13 ::=    SEQUENCE (SIZE (1..maxCE-Level-r13)) OF RACH-CE-LevelInfo-r13

```
RACH-CE-LevelInfo-r13 ::=          SEQUENCE {
    preambleMappingInfo-r13         SEQUENCE {
        firstPreamble-r13               INTEGER(0..63),
        lastPreamble-r13                INTEGER(0..63)
    },
    ra-ResponseWindowSize-r13       ENUMERATED {sf20, sf50, sf80, sf120, sf180,
                                                 sf240, sf320, sf400},
    mac-ContentionResolutionTimer-r13   ENUMERATED {sf80, sf100, sf120,
                                                 sf160, sf200, sf240, sf480, sf960},
    rar-HoppingConfig-r13           ENUMERATED {on,off},
    ...,
    [[ preamblesGroupAConfig-CE-r13     SEQUENCE {
        sizeOfRA-PreamblesGroupA-CE-r13  ENUMERATED {n4, n8, n12, n16, n20, n24, n28,
                                                 n32, n36, n40, n44, n48, n52, n56, n60},
        messageSizeGroupA-CE-r13         ENUMERATED {b56, b88, b144, b208},
    }                                                                    -- Need OP
      OPTIONAL
    ]]
}
```

Fig. 6B

RADIO TERMINAL, BASE STATION, AND METHOD THEREFOR

This Application is a National Stage of International Application No. PCT/JP2017/000080 filed Jan. 5, 2017, claiming priority based on Japanese Patent Application No. 2016-096516 filed May 12, 2016, the disclosure of which is incorporated herein in its entirety by reference.

TECHNICAL FIELD

The present disclosure relates to radio communication systems and, in particular, to a random access procedure.

BACKGROUND ART

The 3rd Generation Partnership Project (3GPP) has been standardizing Cellular Internet of Things (CIoT). CIoT covered by 3GPP includes Long Term Evolution enhanced Machine to Machine (LTE eMTC) and Narrowband IoT (NB-IoT). The characteristic features of LTE eMTC and NB-IoT include ultra-low User Equipment (UE) power consumption, a large number of devices per cell, narrowband spectrum, and extended coverage. In LTE eMTC (Category M), UE Radio Frequency (RF) bandwidth is defined as 1.4 MHz. Meanwhile, in NB-IoT, it is assumed that downlink and uplink peak rates are 200 kbps or 144 kbps, and UE RF bandwidth is about 200 kHz (effective bandwidth is 180 kHz) in both uplink and downlink for further cost optimization, low power consumption, and coverage extension.

Non-Patent Literature 1 describes several communication architecture solutions for infrequent small data transmission in the NB-IoT. These solutions include an architecture for data transmission through the control plane (i.e., Solution 2) and an architecture for data transmission through the user plane (i.e., Solution 18) involving suspension and resumption of a Radio Resource Control (RRC) connection. In Non Patent Literature 1, support of the solution 2 is mandatory for both the UE and the network, while support of the solution 18 is optional for both the UE and the network.

The solution 2 and solution 18 are also referred to as "Data over NAS (DoNAS)" and "AS context caching", respectively. Alternatively, the solution 2 and solution 18 are also referred to as "Control Plane CIoT EPS optimisation" and "User Plane CIoT EPS optimisation", respectively.

The architecture according to the solution 18 provides infrequent small data transmission on the user plane. The architecture according to the solution 18 has the feature of reusing information obtained from the previous RRC connection for the subsequent RRC connection setup, thereby reducing the signaling required for UE Radio Resource Control (RRC) state transition.

Specifically, a UE enters the RRC-Idle mode from the RRC-Connected mode and retains information about the RRC connection (e.g., an Access Stratum Security Context, bearer related information (incl. RoHC state information), and L2/1 parameters when applicable) while it is in RRC-Idle mode. Similarly, an eNB retains information about the RRC connection of the UE (e.g., Access Stratum Security Context, bearer-related information (incl. RoHC state information), and L2/1 parameters when applicable). Further, the eNB and the Mobility Management Entity (MME) retain S1AP UE Contexts. Furthermore, the eNB retains S1-U tunnel addresses.

When returning to the RRC-Connected mode, the UE sends an RRC Connection Resume Request to the eNB. The eNB restores a DRB(s), a security context, an S1AP connection, and an S1-U tunnel(s) based on the previously retained information about the RRC connection. Further, the eNB informs the MME of a UE state change using a new S1AP message (e.g., S1AP: UE Context Resume Request). The MME returns the Evolved Packet System (EPS) Connection Management (ECM) state of the UE to the ECM-Connected state and then sends a Modify Bearer Request message to the Serving Gateway (S-GW). As a result, the S-GW recognizes that the UE is in the connected state and hence becomes ready to transmit downlink data towards the UE.

In the solution 18, the UE can return to RRC-Connected and ECM-Connected without transmitting a NAS message (i.e., Service Request). Further, as compared with the legacy RRC connection setup procedure, the following RRC messages can be removed:

RRC Connection Setup Complete;
RRC Security Mode Command;
RRC Security Mode Complete;
RRC Connection Reconfiguration; and
RRC Connection Reconfiguration Complete.

A Resume ID is used to enable suspension and resumption of an RRC connection. The Resume ID is used to distinguish between suspended UEs, RRC connections, or UE contexts. The eNB includes the Resume ID in a downlink RRC message (e.g., RRC Connection Release) for instructing a UE to suspend RRC connection. The UE transmits an RRC connection Resume Request message containing the Resume ID when resuming the RRC connection.

In addition, it is expected that the UE in RRC-Idle performs cell reselection, move to a cell of another eNB, and then makes an RRC Connection Resume Request in this cell. In this case, the another eNB (i.e., target eNB) specifies, based on the Resume ID, an eNB (i.e., source eNB) which manages a cell in which the UE suspends its RRC connection. The target eNB transmits a RETRIEVE UE CONTEXT REQUEST message including the Resume ID, the Short MAC-I, and the E-UTRAN Cell Identifier (ECGI) to request the source eNB to send a UE context. In response to this message, the source eNB determines whether the UE context matches (i.e., whether resumption succeeds). When the UE context matches (or resumption succeeds), the source eNB sends the UE context to the target eNB via a RETRIEVE UE CONTEXT RESPONSE message. The target eNB further sends a UE CONTEXT RESUME REQUEST message to an MME. The MME instructs an S-GW/Packet Data Network Gateway (P-GW) to reestablish (or modify) a bearer and transmits a UE CONTEXT RESUME RESPONSE to the target eNB. Consequently, the target eNB and the UE can resume data transmission and reception.

Currently, it is assumed that the Resume ID consists of a 20-bit length eNB ID and a 20-bit length UE ID and thus has the 40-bit length. When an initial uplink RRC message (i.e., RRC Connection Resume Request message) containing the 40-bit length Resume ID is transmitted by the third message (Msg3) of the random access, the minimum size (i.e., 56 bits) is insufficient for the Msg3 size, and it requires 80 bits or 88 bits.

The 3GPP further studies applying the above signaling expansion (i.e., the solution 2 and the solution 18) regarding NB-IoT also to a non-NB-IoT system (e.g., LTE). Non-NB-IoT UEs are, for example, LTE eMTC (Category M) UEs.

In the case of Non-NB-IoT UEs, if a 40-bit Resume ID is used, the eNB needs to allocate 80-bit or 88-bit uplink resources (i.e., Physical Uplink Shared Channel (PUSCH)

resources) for the third message (Msg3) transmission, via the second message (Msg2) of the random access, i.e., an uplink (UL) grant included in the random access response. Meanwhile, non-NB-IoT UEs need to always transmit an 80-bit or 88-bit Msg3 regardless of the purpose thereof, i.e., not only for an RRC Connection Resume Request, an RRC Connection Request and an RRC Connection Reestablishment Request. That is, an RRC Connection Request or an RRC Connection Reestablishment Request is transmitted with padding bits, which causes waste of radio resources.

In addition, if the size of the third message (Msg3) of the random access procedure increases, a coverage guaranteed by the legacy LTE is not likely to be guaranteed. That is, an increase in the Msg3 size would restrict the LTE UL coverage for non-NB-IoT (e.g., LTE) UEs.

Non-Patent Literature 2 proposes using only part of the 40-bit Resume ID to avoid an impact on the UL coverage caused when the 40-bit Resume ID is always used for non-NB-IoT UEs. Specifically, Non-Patent Literature 2 proposes that non-NB-IoT UEs transmit a truncated Resume ID (i.e., 25 least significant bits (LSB) of the 40-bit Resume ID) via a Msg3 for RRC resume. Furthermore, Non-Patent Literature 2 proposes introducing a Resume ID type indication in the system information for non-NB-IoT UEs. The Resume ID type indication indicates which one of the full resume ID and the truncated resume ID shall be used by non-NB-IoT UEs to transmit via a Msg3 for RRC resume.

Furthermore, the 3GPP studies reusing the legacy PRACH partitioning to enable an eNB to distinguish whether a received PRACH preamble is intended for transmission of an 80-bit (or 88-bit) Msg3 (i.e., an RRC Connection Resume Request containing the full resume ID) or for transmission of a 56-bit Msg3 (i.e., an RRC Connection Request, an RRC Connection Reestablishment Request, or an RRC Connection Resume Request containing the truncated resume ID).

Specifically, when non-NB-IoT UEs transmit a Msg3 which carries an RRC message containing the full resume ID, the non-NB-IoT UEs select a Random-Access-Preambles group associated with the Msg3 size of 80 bits or more and then select a preamble from the selected Preambles group. On the other hand, when non-NB-IoT UEs transmit a Msg3 composed of 56 bits or less and carrying an RRC message that contains the truncated resume ID or carrying a legacy RRC Connection Request message or an RRC Connection Reestablishment Request message, the non-NB-IoT UEs select another Random-Access-Preambles group associated with the Msg3 size of 56 bits and then select a preamble from the selected Preambles group. The eNB can determine, based on the received PRACH preamble, which PUSCH resource associated with one of the 56-bit Msg3 and the 80-bit Msg3 needs to be allocated.

CITATION LIST

Non Patent Literature

Non-Patent Literature 1: 3GPP TR 23.720 V1.2.0 (2015 November), "3rd Generation Partnership Project; Technical Specification Group Services and System Aspects; Architecture enhancements for Cellular Internet of Things (Release 13)", November 2015
Non-Patent Literature 2: 3GPP R2-162269, Huawei, HiSilicon, "Resume ID for non-NB-IoT UEs", 3GPP TSG-RAN WG2 Meeting #93bis, Dubrovnik, Croatia, 11-15 Apr. 2016

SUMMARY OF INVENTION

Technical Problem

However, it should be noted that the legacy PRACH partitioning is not applied to eMTC (Category M) UEs. The Category M UEs perform PRACH resource selection based on a Coverage Enhancement (CE) level. The 3GPP specifies a coverage enhancement (CE) technique for eMTC (Category M) UEs.

For example, the coverage enhancement technique provides three CE levels in addition to normal coverage (or zero coverage extension). The CE levels are associated respectively with different numbers of transmission repetitions and with different numbers of reception repetitions. The number of transmission repetitions and the number of reception repetitions used in a high CE level are larger than those used in a low CE level. A Category M is allocated to a higher CE level, as the pathloss between this Category M UE and the eNB increases. In some implementations, a Category M UE measures a Reference Signal Received Power (RSRP) from the eNB or measures an estimated pathloss between the MTC UE and the eNB, determines (or estimates) a required CE level based on the measured RSRP or pathloss and based on a threshold for determining a CE level provided by system information (e.g., System Information Block (SIB)). After that, the Category M UE selects a random access resource (i.e., Physical Random Access Channel (PRACH) resource) associated with the determined CE level and then transmits a RACH preamble in accordance with the maximum number of transmission repetitions associated with the determined CE level.

Accordingly, there needs to be a new mechanism, suitable in particular for UEs (i.e., Category M UEs) supporting the coverage enhancement, to associate the Msg3 size desired by these UEs and uplink resource allocation for the Msg3 transmission indicated by an UL grant within the Msg2 sent from the eNB. One of the objects to be attained by embodiments disclosed herein is to provide an apparatus, a method, and a program that contribute to enabling a base station (e.g., eNB) to easily know the Msg3 size desired by a radio terminal (e.g., Category M UEs). It should be noted that the above-described object is merely one of the objects to be attained by the embodiments disclosed herein. Other objects or problems and novel features will be made apparent from the following description and the accompanying drawings.

Solution to Problem

In a first aspect, a radio terminal includes a memory and at least one processor coupled to the memory. The at least one processor is configured to determine (a) a pathloss level between the radio terminal and a base station, (b) a coverage enhancement level based on the pathloss level, or (c) a coverage enhancement mode configured in the radio terminal. The at least one processor is further configured to choose between non-truncated first information and truncated first information, having a smaller bit length than the non-truncated first information, to be included in an initial uplink Radio Resource Control (RRC) message transmitted within a random access procedure, based on the determined pathloss level, coverage enhancement level, or coverage enhancement mode.

In a second aspect, a method in a radio terminal includes: determining (a) a pathloss level between the radio terminal and a base station, (b) a coverage enhancement level based on the pathloss level, or (c) a coverage enhancement mode configured in the radio terminal; and choosing between non-truncated first information and truncated first information, having a smaller bit length than the non-truncated first information, to be included in an initial uplink Radio Resource Control (RRC) message transmitted within a random access procedure, based on the determined pathloss level, coverage enhancement level, or coverage enhancement mode.

In a third aspect, a base station includes a memory and at least one processor coupled to the memory. The at least one processor is configured to transmit broadcast information in a cell. The broadcast information indicates, which of non-truncated first information and truncated first information having a smaller bit length than the non-truncated first information is to be included in an initial uplink Radio Resource Control (RRC) message transmitted within a random access procedure, (a) per pathloss level between the radio terminal and a base station, (b) per coverage enhancement level based on the pathloss level, or (c) per coverage enhancement mode configured in the radio terminal.

In a fourth aspect, a method in a base station includes: generating broadcast information; and transmitting the broadcast information in a cell. The broadcast information indicates, which of non-truncated first information and truncated first information having a smaller bit length than the non-truncated first information is to be included in an initial uplink Radio Resource Control (RRC) message transmitted within a random access procedure, (a) per pathloss level between the radio terminal and a base station, (b) per coverage enhancement level based on the pathloss level, or (c) per coverage enhancement mode configured in the radio terminal.

In a fifth aspect, a program includes a set of instructions (software codes) that, when loaded into a computer, causes the computer to perform a method according to the above-described second, fourth or sixth aspect.

Advantageous Effects of Invention

According to the above-described aspects, it is possible to provide an apparatus, a method, and a program that contribute to enabling a base station (e.g., eNB) to easily know the Msg3 size desired by a radio terminal (e.g., Category M UEs).

BRIEF DESCRIPTION OF DRAWINGS

FIG. 5 is a diagram showing an example of an information element which specifies the size of a resume ID transmitted by the third message (Msg3) in random access per coverage enhancement level;

FIG. 6A is a diagram showing an example of an information element which specifies the size of the resume ID transmitted by the third message (Msg3) in random access per coverage enhancement level;

FIG. 6B is a diagram showing an example of an information element which specifies the size of the resume ID transmitted by the third message (Msg3) in random access per coverage enhancement level;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on radio communication networks for LTE eMTC. However, these embodiments may be applied to communication of other UEs in LTE, LTE-Advanced, and modified versions thereof. That is, these embodiments may be applied to radio networks for communication of other UEs related to LTE, LTE-Advanced, and modified versions thereof. Furthermore, these embodiments are not limited to LTE, LTE-Advanced, and modified versions thereof, and may be applied to other radio communication networks.

First Embodiment

Figure 1:
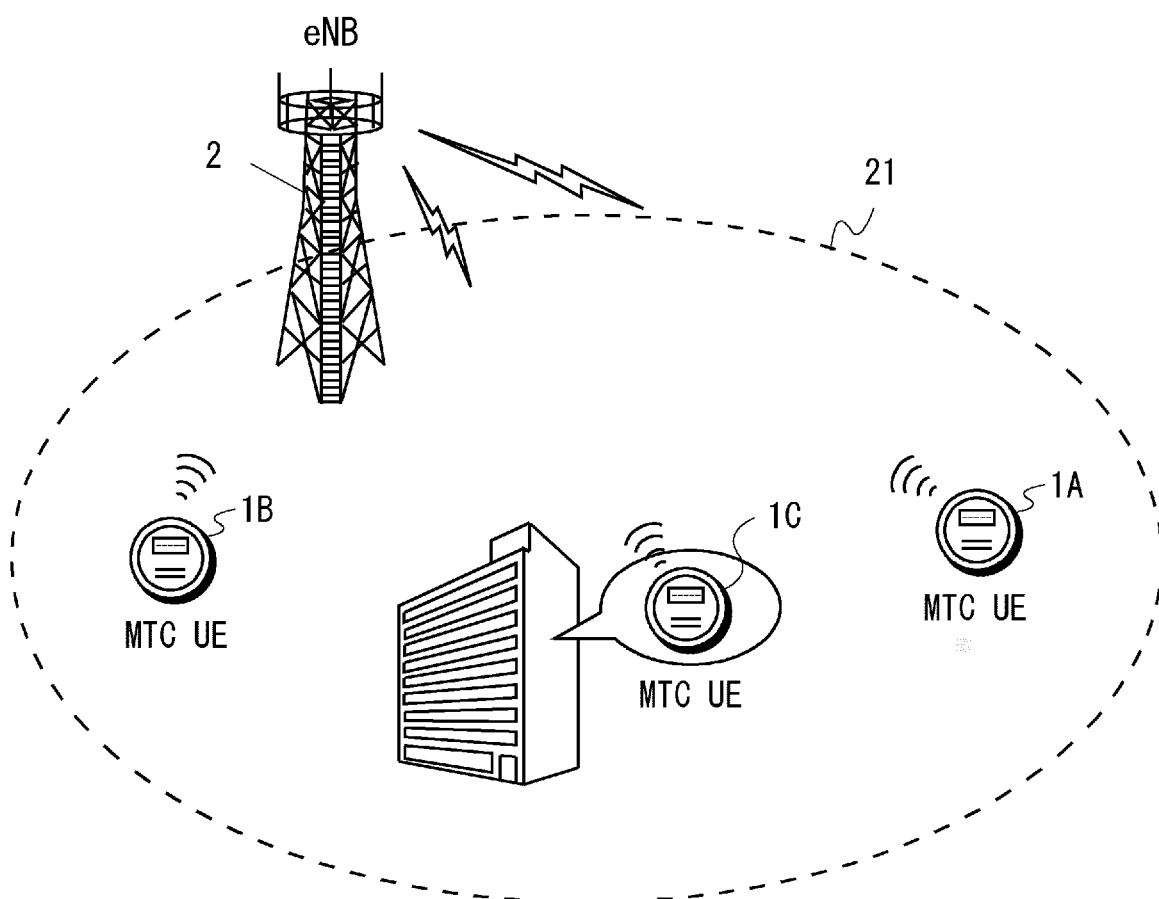
FIG. 1 is a diagram showing a configuration example of a radio communication network according to some embodiments.

FIG. 1 shows a configuration example of a radio communication network according to several embodiments including this embodiment. In the example shown in FIG. 1, the radio communication network includes one or more radio terminals (UEs) 1 and a base station (eNB) 2. Each UE 1 is equipped with at least one wireless transceiver and is configured to perform cellular communication with the eNB 2. The eNB 2 is configured to manage a cell 21 and perform cellular communication with the UEs 1 using a cellular communication technology (e.g., Evolved Universal Terrestrial Radio Access (E-UTRA) technology).

The eNB 2 shown in FIG. 1 may be a Baseband Unit (BBU) used in the Centralized Radio Access Network (C-RAN) architecture. In other words, the eNB 2 shown in FIG. 1 may be a RAN node to be connected to one or more Remote Radio Heads (RRHs). In some implementations, the eNB 2 serving as a BBU takes charge of control-plane processing and digital baseband signal processing for the user-plane. On the other hand, each RRH takes charge of analog Radio Frequency (RF) signal processing (e.g., frequency conversion and signal amplification). The C-RAN is also referred to as a Cloud RAN. The BBU is also referred to as a Radio Equipment Controller (REC) or a Data Unit (DU). The RRH is also referred to as a Radio Equipment (RE), a Radio Unit (RU), or a Remote Radio Unit (RRU).

In the example shown in FIG. 1, each UE 1 is an eMTC (Category M) UE. In the example shown in FIG. 1, the distance between the eNB 2 and the UE 1A is larger than the distance between the eNB 2 and the UE 1B. Accordingly, it is assumed that the UE 1A has a larger pathloss and its radio quality is degraded. Further, the UE 1C is installed inside a structure (e.g., a building) and it is thus assumed that its radio quality becomes lower than that in a case in which the UE 1C is installed outdoors. Furthermore, if the capabilities or functions of the UEs 1 are limited compared to those of other UEs (e.g., smartphones and tablet computers) that perform human type communication, such as voice communication and web browsing, it is expected that degradation in the radio quality of the UEs 1 will become more serious. Accordingly, the UEs 1 according to this embodiment support the aforementioned coverage enhancement technique. To improve the downlink (DL) cell coverage, repetition of DL transmission, e.g., repetitive transmission of system information, MTC-Physical Downlink Control Channel (M-PDCCH), and Physical Downlink Shared Channel (PDSCH) may be used. Meanwhile, to improve the uplink (UL) cell coverage, repetition of UL transmission, e.g., repetitive transmission of RACH preamble, Physical Uplink Control Channel (PUCCH), and PUSCH may be used.

The UE 1 may support a plurality of Coverage Enhancement (CE) Modes. In some implementations, the UE 1 may support CE modes for the RRC_CONNECTED state and other CE modes for the RRC_IDLE state. Additionally or alternatively, the MTC UE 1 may support either CE modes (e.g., CE mode A and CE mode B) for the RRC_CONNECTED state or CE modes for the RRC_IDLE state. In some implementations, plural coverage enhancement levels are defined per CE mode. In some implementations, plural CE modes provide respectively different coverage enhancement levels.

In the following, an operation of a UE 1 for enabling the eNB 2 to easily know the Msg3 size desired by this UE 1 will be described. As is well known, the Msg3 of LTE is an initial uplink layer 2/layer 3 message transmitted in the random access procedure. Specifically, for example, the Msg3 contains a Common Control Channel Service Data Unit (CCCH SDU). The CCCH is a logical channel used when there is no RRC connection. The CCCH SDU contains an initial uplink RRC message containing a UE Identity (e.g., a random value or an S-TMSI) for contention resolution. The initial uplink RRC message is, for example, an RRC Connection Request, an RRC Connection Reestablishment Request, or an RRC Connection Resume Request. As already described, the RRC Connection Resume Request message is transmitted by NB-IoT UEs and non-NB-IoT UEs which support AS Context Caching (i.e., solution 18) to resume an RRC connection.

Figure 2:
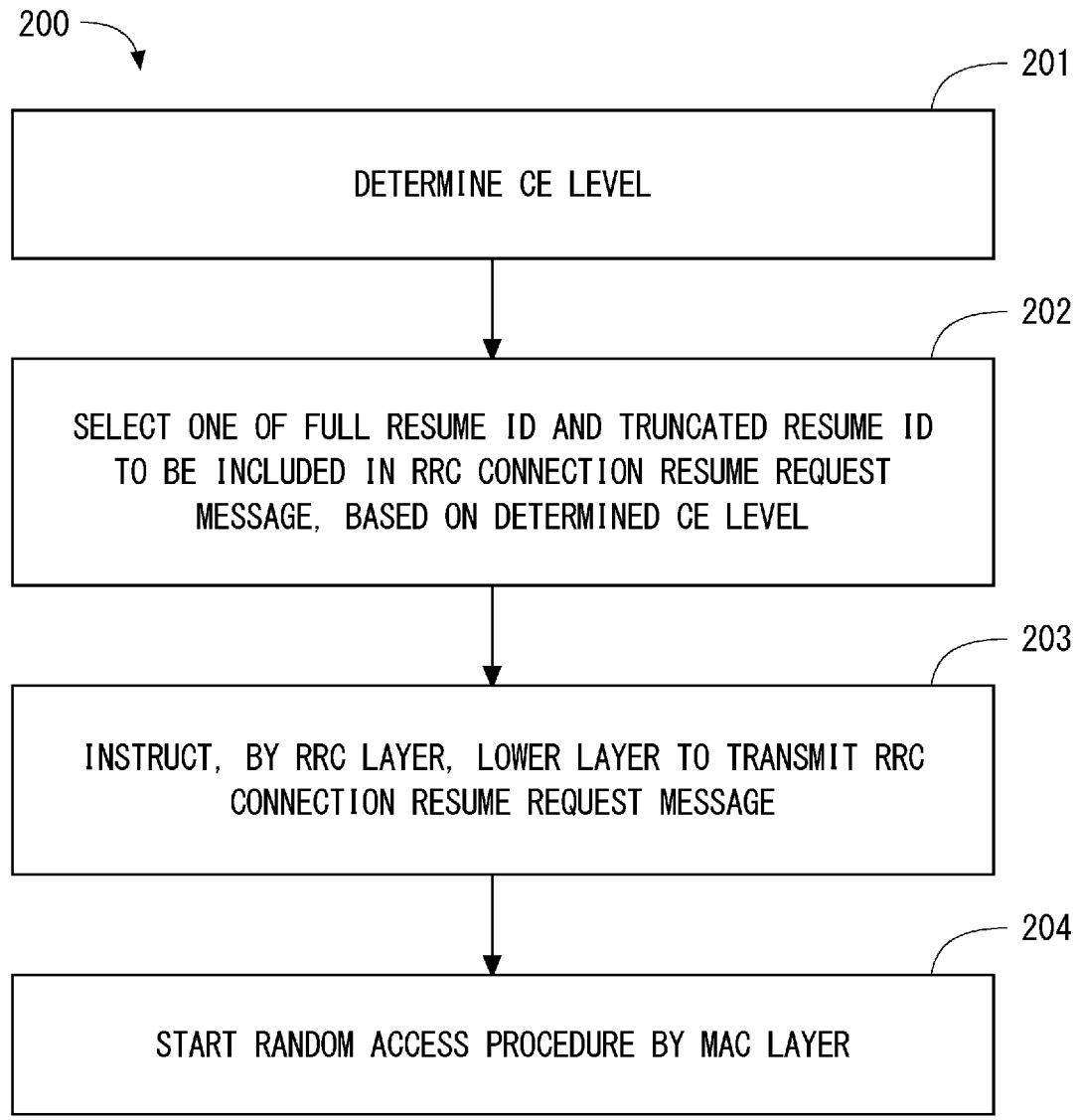
FIG. 2 is a flowchart showing an example of an operation of a radio terminal according to a first embodiment.

FIG. 2 is a flowchart showing an example of an operation of the UE 1. The procedure shown in FIG. 2 is executed by the UE 1 which supports AS Context Caching (solution 18) and has suspended its RRC connection.

In step 201, the RRC layer of the UE 1 determines a coverage enhancement (CE) level. Specifically, the UE 1 determines (or estimates) a required CE level based on a measurement value of reception quality (e.g., RSRP) of a signal from the eNB 2 or a measurement value (or estimation value) of pathloss between the UE 1 and the eNB 2. In one example, three CE levels may be used in addition to normal coverage (or zero coverage extension). That is, the UE 1 may select one CE level from these four CE levels. The CE levels are associated respectively with different numbers of transmission repetitions and with different numbers of reception repetitions. The number of transmission repetitions and the number of reception repetitions used in a higher CE level are larger than those used in a lower CE level.

In step 202, the RRC layer of the UE 1 choose between the full resume ID and the truncated resume ID to be included in the RRC Connection Resume Request message, based on the determined CE level. In other words, the UE 1 determines, based on the required CE level for the UE 1, which one of the full resume ID and the truncated resume ID is to be transmitted by the RRC Connection Resume Request message. As already described, the Resume ID (i.e., full resume ID) is identification information transmitted from the eNB 2 to the UE 1 by an RRC Connection Release message in which the "releaseCause" is set to "rrcSuspend" to suspend the RRC connection. The Resume ID has a 40-bit length, for example. In contrast with this, the truncated resume ID is a shortened resume ID which has a shorter bit length than the full resume ID. The Truncated resume ID is derived from the full resume ID. For example, the Truncated resume ID may be 25 LSB of the 40-bit full resume ID.

Specifically, when selecting a specific CE level from the plurality of CE levels, the UE 1 transmits the truncated resume ID, instead of the full resume ID, in the RRC connection Resume Request message. In contrast, when selecting one of the remaining one or more CE levels, the UE 1 transmits the full resume ID in the RRC Connection Resume Request message.

In step 203, the RRC layer of the UE 1 instructs a lower layer(s) including the Medium Access Control (MAC) layer to transmit a CCCH SDU containing the RRC Connection Resume Request message. The RRC Connection Resume Request message or the CCCH SDU contains one of the full resume ID or the truncated resume ID selected in Step 2.

In Step 204, the MAC layer of the UE 1 executes the random access procedure in response to the request from the RRC layer for transmission of the RRC Connection Resume Request message or the CCCH SDU. The random access procedure includes, for example, the following steps (a) to (d):

(a) Selecting a random access resource based on the CE level determined in step 201;
(b) Transmitting a random access preamble to the eNB 2 according to the selected random access resource;
(c) Receiving from the eNB 2 a random access response to the random access preamble transmitted in step (b); and
(d) Transmitting an initial uplink RRC message (i.e., the RRC Connection Resume Request message containing one of the full resume ID or the truncated resume ID) by using the uplink resource designated in the random access response.

Figure 3:
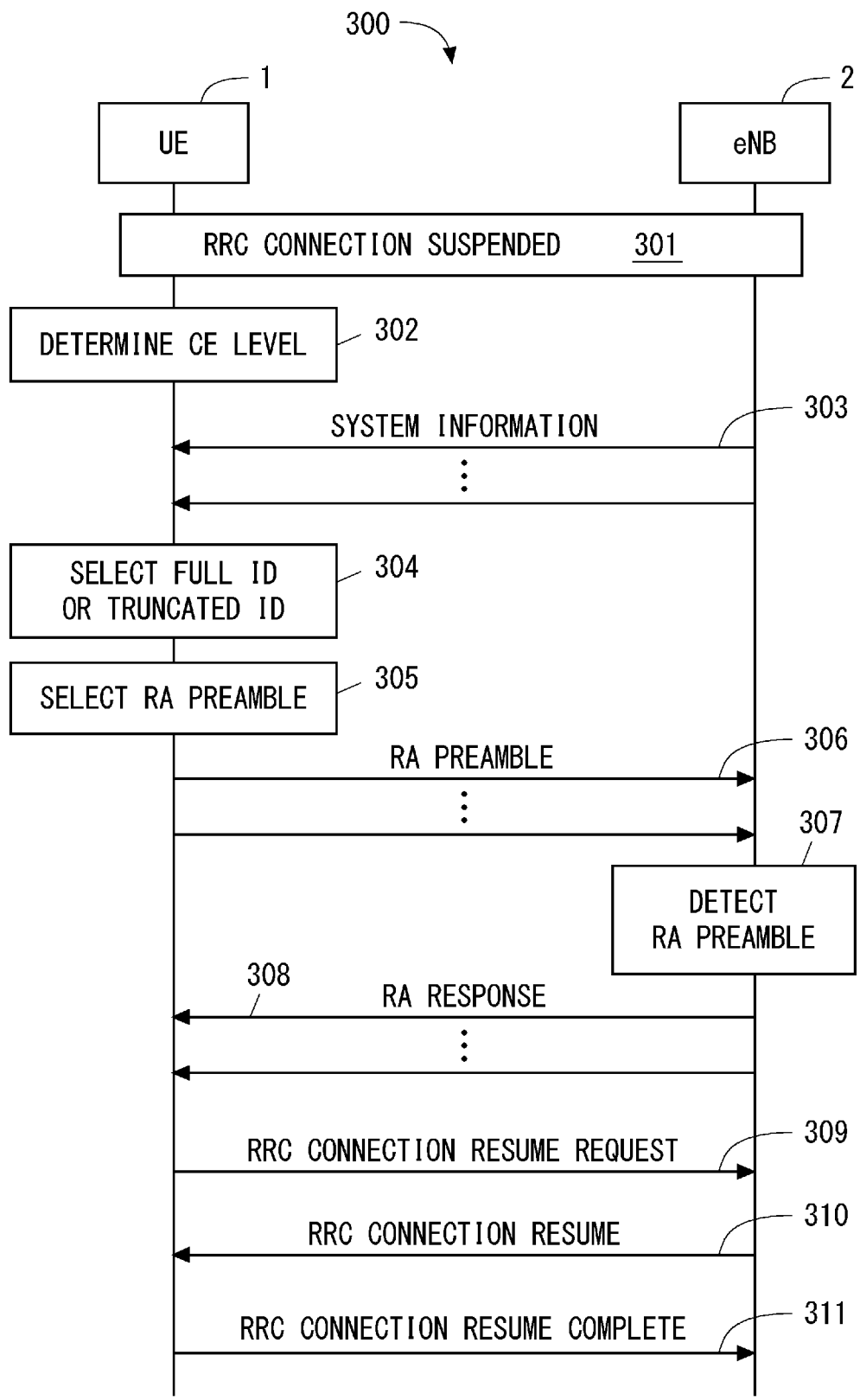
FIG. 3 is a sequence diagram showing an example of a communication procedure according to the first embodiment.

FIG. 3 is a sequence diagram showing a process 300 that is an example of the random access procedure according to this embodiment. In step 301, the UE 1 executes a suspension operation for AS Context Caching (i.e., solution 18). That is, the UE 1 is in an RRC idle state and retains a context (i.e., UE context) related to the previous RRC connection. For example, the UE 1 may retain the resume ID as part of the UE context or retain the UE context in association with the resume ID.

In step 302, the UE 1 (i.e., RRC layer) starts the RRC Connection Resume procedure for an initial access from the RRC_IDLE state. Specifically, the UE 1 determines a required CE level. In step 303, the UE 1 receives system information transmitted from the eNB 2 while applying the coverage enhancement technique (e.g., repetitive transmission of the system information (i.e., System Information Block (SIB)) according to the determined CE level. The system information includes a random access configuration (i.e., PRACH config and RACH config) per CE level. The random access configuration per CE level includes, for example, information related to the following:
- an index of a RACH preamble
- the maximum number of PRACH attempts
- the number of repetitions of preamble transmission per PRACH attempt
- a duration of a random access (RA) response window;
- a value of a contention resolution timer; and
- the number of repetitions of M-PDCCH transmission for random access response (RAR) message transmission.

In step 304, the UE 1 (i.e., RRC layer) selects one of the full resume ID and the truncated resume ID to be included in an RRC Connection Resume Request message based on the CE level determined in step 302. The RRC layer of the UE 1 then requests the lower layer(s) including the MAC layer to transmit the RRC Connection Resume Request message.

In step 305, the MAC layer of the UE 1 starts the random access procedure. That is, the UE 1 (i.e., MAC layer) selects a random access (RA) preamble based on the CE level determined in step 302. In step 306, the UE 1 transmits the random access preamble. The preamble transmission in step 306 may be performed according to a preamble transmission configuration (e.g., the maximum number of PRACH attempts and the number of repetitions of preamble transmission per PRACH attempt) regarding the CE level determined in step 301.

In step 307, the eNB 2 detects the random access preamble transmitted from the UE 1. The eNB 2 determines the CE level of the UE 1 based on, for example, the radio resource on which the random access preamble has been detected. The eNB 2 then performs an operation for the coverage enhancement including repetitive transmission of a random access response (step 308) according to the determined CE level of the UE 1.

The random access response in step 308 contains a UL grant indicating PUSCH resource allocation to the UE 1 for Msg3 transmission (step 309). Note that, according to this embodiment, the eNB 2 can know the size of a Msg3 which the UE 1 desires to transmit, based on the CE level of the UE 1. Accordingly, the eNB 2 only needs to determine, based on the CE level of the UE 1, the size allowed by the UL grant, i.e., the size of the PUSCH resources to be allocated to the UE 1 for Msg3 transmission (step 309).

In step 309, the UE 1 transmits the Msg3 containing an RRC Connection Resume Request message to the eNB 2 according to the UL grant included in the random access response in step 308.

In step 310, when the eNB 2 can resume the suspended RRC Connection, the eNB 2 transmits an RRC Connection Resume message to the UE 1. This message may include, for example, radio resource configuration information (RadioResourceConfigDedicated IE) and security configuration information, such as NextHopChainingCount, which is necessary to activate AS layer security. Note that, whether the RRC connection can resume is determined based on the Resume ID and a Short MAC-I included in the RRC Connection Resume Request message.

In step 311, the Access Stratum (AS) layer of the UE 1 performs reestablishment of the Layer 2 (e.g., MAC reset, RLC reestablishment, and PDCP reestablishment), update of the security keys, and the like, based on the retained UE context and notifies the higher layer (i.e., NAS) of the resumption of the RRC connection. The UE 1 then transmits an RRC Connection Resume Complete message to the eNB 2.

The choice between the full resume ID and the truncated resume ID based on the CE level shown in FIG. 2 and the random access procedure shown in FIG. 3 are merely examples of the operations of the UE 1 and the eNB 2 according to this embodiment and can be modified as appropriate as described below. For example, the UE 1 may use the CE level at the time of the resumption of its RRC connection to select one of the full resume ID and the truncated resume ID. Instead, the UE 1 may use the CE level at the time of the suspension of its RRC connection to select one of the full resume ID and the truncated resume ID.

As can be understood from the foregoing, in this embodiment, the choice by a UE 1 between the full resume ID and the truncated resume ID is associated with the CE level of this UE 1. The following provides some methods to define this association.

In the first example, the association between each CE level and one of the full resume ID and the truncated resume ID is preconfigured in the UE 1 and the eNB 2. For example, the UE operation shown in FIG. 4 may be specified in the 3GPP standards regarding the RRC protocol and the UE 1 may operate according to the specified UE operation.

In the example in FIG. 4, if the UE 1 is a Bandwidth shortened Low complexity (BL) UE or in Coverage Enhancement (CE) (401) and if the "fullResumeID" is included in a predetermined information element (e.g., Resume ID type indication IE) in the system information (e.g., SIB Type 1) (402), the UE 1 operates as follows. The "fullResumeID" within the system information indicates that the eNB 2 permits the UE 1 to transmit the full resume ID via a Msg3 in the cell 21. If the CE level of the UE 1 is the maximum CE level (alt. 1) or a CE level X or more (alt. 2) (403), the UE 1 sets the "resumeIdentity" to the "TruncatedResumeIdentiy" (e.g., 25 bits LSB of Resume ID) (404), otherwise the UE 1 sets the "resumeIdentity" to the "FullResumeIdentiy" (e.g., 40-bit Resume ID) (406). Otherwise (i.e., the "fullResumeID" is not included in the system information) (407), the UE 1 sets the "resumeIdentity" to the "TruncatedResumeIdentiy" (408).

In other words, when the CE level of the UE 1 is the maximum CE level (alt. 1) or it is the CE level X or more (alt. 2) (403), the UE 1 includes the truncated resume ID in an RRC Connection Resume Request message (404). On the other hand, when the CE level of the UE 1 is not the maximum CE level (alt. 1) or it is lower than the CE level X (alt. 2) (405), the UE 1 includes the full resume ID in an RRC Connection Resume Request message (406). As already described, the number of transmission repetitions and the number of reception repetitions used for a higher CE level are larger than those used for a lower CE level. That is, a higher CE level means greater pathloss between the UE 1 and the eNB 2.

Figure 4:
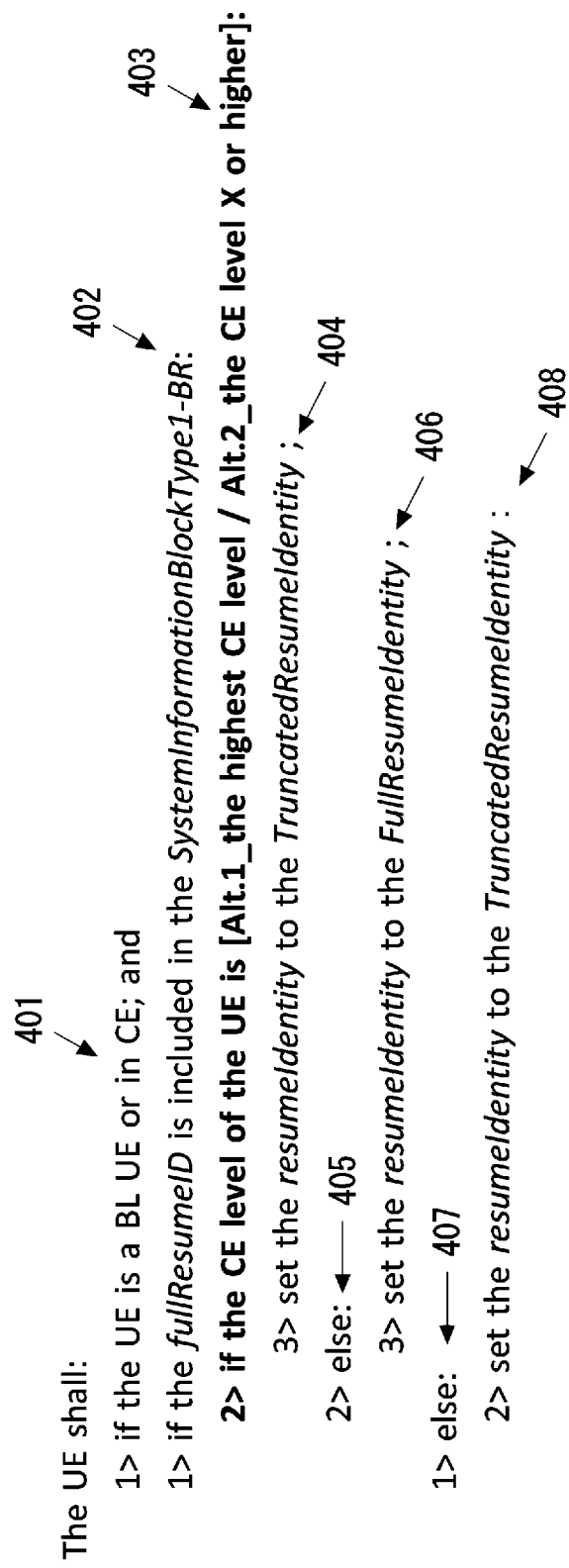
FIG. 4 is a diagram showing an example of description which defines an operation of a radio terminal according to the first embodiment.

The "fullResumeID" shown in FIG. 4 is a mere example of information (e.g., a value or a name) for instructing transmission of an RRC Connection Resume Request message containing the full resume ID and, accordingly, another information (e.g., a value or a name), such as "fullID", "full", "non-truncatedID", or "non-truncated", may be used instead of the "fullResumeID". Similarly, the Resume ID type indication is a mere example of the information element (IE) including the "fullResumeID", and thus another IE (e.g., a ResumeID-Type, a ResumeID, or a ResumeIdentity) may be used. Furthermore, these information elements may be transmitted by a SIB Type2 or a Master Information Block (MIB) instead of the SIB Type1.

Furthermore, FIG. 4 shows an example in which the "fullResumeID" is transmitted, although a "truncatedResumeID" may alternatively be transmitted. For example, if the UE 1 is notified of the "truncatedResumeID" and if the UE 1 is in the high CE level (alt. 1) or the CE level of the UE 1 is the CE level X or more (alt. 2), the UE 1 set the "resumeIdentity" to the "TruncatedResumeIdentiy". If the UE 1 is not notified of the "truncatedResumeID", the UE 1 may set the "resumeIdentity" to the "FullResumeIdentity".

In the second example, the eNB 2 explicitly notifies the UE 1 of an association between each CE level and one of the full resume ID and the truncated resume ID. FIG. 5 shows an example of an information element (IE) included in system information (e.g., SIB) for specifying the association between each CE level and one of the full resume ID and the truncated resume ID. The "Resume-CE-LevelInfoList" IE shown in FIG. 5 includes "Resume-CE-LevelInfo" IEs for respective CE levels. Each "Resume-CE-LevelInfo" IE includes a "reportResumeIdentity-CE" IE (501). The "reportResumeIdentity-CE" IE (501) indicates the full resume ID (e.g., "full") or the truncated resume ID (e.g., "truncated").

When the "reportResumeIdentity-CE" IE (501) corresponding to the CE level of the UE 1 indicates the full resume ID, the UE 1 operates to transmit the full resume ID via an RRC Connection Resume Request message. In contrast, when the "reportResumeIdentity-CE" IE (501) corresponding to the CE level of the UE 1 indicates the truncated resume ID, the UE 1 operates to transmit the truncated resume ID via an RRC Connection Resume Request message.

In the third example, the eNB 2 uses a RACH configuration (RACH-Config) to indicate, per CE level, whether PRACH partitioning is used. The RACH configuration is broadcasted in the cell 21 through the system information (e.g., SIB). That is, when using the PRACH partitioning in a certain CE level, the eNB 2 further divide the PRACH preambles to be allocated to this CE level into two. Different Msg3 sizes are used for these two PRACH preamble groups for the certain CE level.

FIGS. 6A and 6B show examples of the RACH configuration (e.g., RACH-Config). In the examples of FIGS. 6A and 6B, the "preambleMappingInfo" IE (602) contained in the "RACH-CE-LevelInfo" IE (601) specifies PRACH preambles to be allocated to each CE level. Furthermore, in the examples of FIGS. 6A and 6B, the "RACH-CE-LevelInfo" IE (601) may include a "preamblesGroupAConfig-CE" IE (603). The "preamblesGroupAConfig-CE" IE (603) specifies the configuration of the PRACH partitioning (i.e., preamble grouping) within each CE level. A "messageSize-GroupA-CE" IE (604) specifies a Msg3 size threshold for the preamble group A within each CE level. For example, when the Msg3 size threshold of the preamble group A is 56 bits (i.e., "b56"), the UE 1 can understand that it can use the random access procedure which uses the preamble group B of this CE level to transmit an RRC Connection Resume Request message including the full resume ID.

In the third example, when the PRACH partitioning is configured for the CE level of the UE 1, the UE 1 operates to transmit the full resume ID via an RRC Connection Resume Request message. In contrast, when the PRACH partitioning is not configured for the CE level of the UE 1, the UE 1 operates to transmit the truncated resume ID via an RRC Connection Resume Request message.

That is, in the third example, to indicate on a per-CE-level basis which one of the full resume ID and the truncated resume ID needs to be transmitted via an RRC Connection Resume Request message (i.e., Msg3), the preamble grouping configuration for each CE level is used. In the example in FIG. 6, the preamble grouping configuration for each CE level is included in the RACH configuration (e.g., RACH-Config) and indicates whether a plurality of random access preambles allocated to each CE level is further divided into two or more subsets.

As can be understood from the foregoing, the UE 1 according to this embodiment selects the truncated resume ID or the full resume ID based on the CE level of this UE 1. In other words, the choice by the UE 1 between the full resume ID and the truncated resume ID is associated with the CE level of the UE 1. Consequently, the eNB 2 according to this embodiment can easily know the Msg3 size desired by the UE 1 (e.g., Category M UE) by knowing the CE level of the UE 1. Accordingly, the UE 1 and the eNB 2 according to this embodiment can appropriately associate the Msg3 size desired by the UEs 1 (e.g., Category M UEs) supporting the coverage enhancement with the uplink resource allocation for Msg3 transmission by an UL grant within the Msg2 sent from the eNB 2. Furthermore, when a coverage level is high (i.e., the required number of repetitions is large), it is possible to guarantee the coverage by decreasing the Msg3 size.

Other Embodiments

The first embodiment described above can be modified, for example, as follows.

In some implementations, a UE 1 may operate to change the size of a Msg3 transmitted in the random access procedure according to the CE level of the UE 1. In this regard, the change of the Msg3 size may include changing the types of or the number of information elements (IEs) which are to be (or should be) included in this Msg3 based on a predetermined rule according to the number of bits in the Msg3 which can be (or should be) transmitted. For example, in the case where there are five types of IEs as contents of a Msg3 for a certain purpose, the UE 1 may determine whether to include only minimum necessary three IEs in the Msg3 or include four or all five IEs in the Msg3, according to the UL grant size allocated for the Msg3. The predetermined rule may be predefined in the standards, or may be provided from a network (e.g., an eNB, or an Operation and Maintenance (O&M) system).

In some implementations, the UE 1 may use its CE mode, instead of its CE level, to choose between the full resume ID and the truncated resume ID. Specifically, the UE 1 may select one of the full resume ID and the truncated resume ID to be included in an RRC Connection Resume Request message depending on the CE mode that was configured in the UE 1 in RRC_CONNECTED when it suspended the RRC connection. Instead, the UE 1 may select one of the full resume ID and the truncated resume ID depending on the CE mode that has been configured in UE 1 in RRC_IDLE when resuming the RRC connection.

Figure 7:
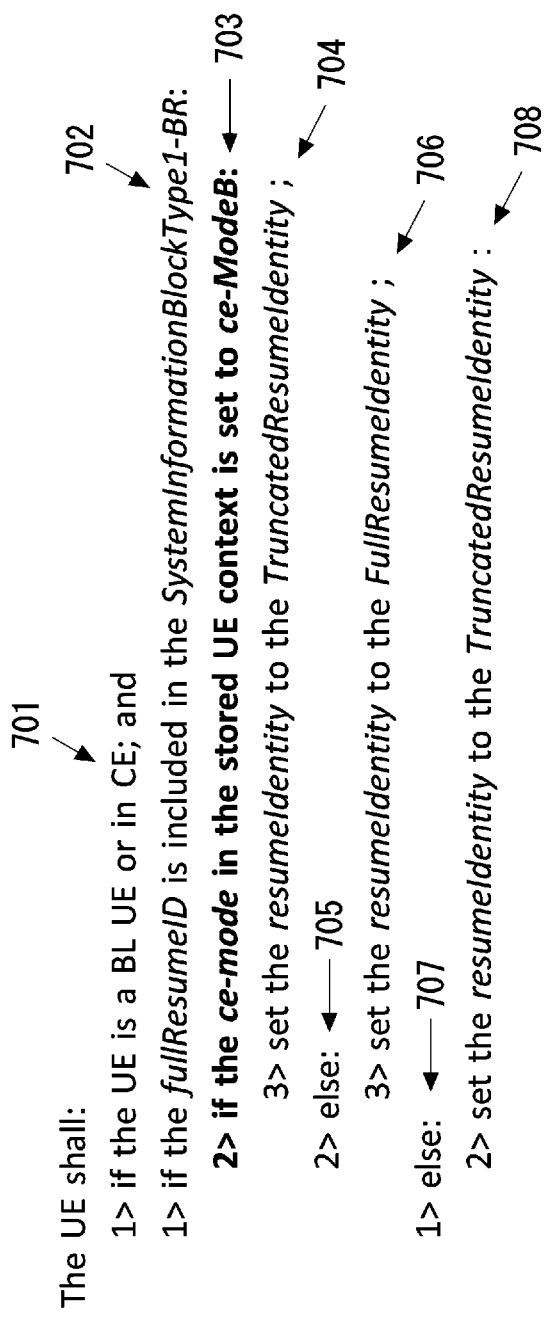
FIG. 7 is a diagram showing an example of description which defines an operation of a radio terminal according to another embodiment.

For example, a UE operation illustrated in FIG. 7 may be specified in the 3GPP standards regarding the RRC protocol and the UE 1 may operate according to the specified UE operation. In the example of FIG. 7, if the UE 1 is a BL UE or in CE (701) and if the "fullResumeID" is included in a predetermined information element (e.g., Resume ID type indication IE) in system information (e.g., SIB Type 1) (702), the UE 1 operates as follows. The "fullResumeID" in the system information indicates that an eNB 2 permits the UE 1 to transmit the full resume ID via a Msg3 in a cell 21.

If the CE mode configured in the UE 1 is CE mode B (703), the UE 1 sets the "resumeIdentity" (704) to the "TruncatedResumeIdentity". Otherwise (705), the UE 1 sets the "resumeIdentity" to the "FullResumeIdentity" (706). Otherwise (i.e., when the "fullResumeID" is not included in the system information) (707), the UE 1 sets the "resumeIdentity" to the "TruncatedResumeIdentity" (708).

In other words, when the CE mode configured in the UE 1 is CE mode B (703), the UE 1 includes the truncated resume ID in an RRC Connection Resume Request message (704). On the other hand, when the CE mode configured in the UE 1 is CE mode A (705), the UE 1 includes the full resume ID in an RRC Connection Resume Request message (706).

In some implementations, the UE 1 may use a pathloss level between the UE 1 and the eNB 2, instead of the CE level, to select one of the full resume ID and the truncated resume ID.

In some implementations, the UE 1 may use the above-described operation for choosing between the full resume ID and the truncated resume ID to transmit another information via an Msg3 in the random access procedure. Specifically, the UE 1 may determine (a) the pathloss level between the UE 1 and the eNB 2, (b) the CE level of the UE 1, or (c) the CE mode configured in the UE 1. After that, the UE 1 may choose between non-truncated first information and truncated first information, having a smaller bit length than the non-truncated first information, to be included in an initial uplink RRC message transmitted within the random access procedure.

According to this operation, the choice by the UE 1 between the truncated first information and the non-truncated first information is associated with the CE level (or the pathloss level or the CE mode) of the UE 1. Consequently, the eNB 2 according to this embodiment can easily know the Msg3 size desired by the UE 1 (e.g., Category M UE) by knowing the CE level (or the pathloss level or the CE mode) of the UE 1. Accordingly, the UE 1 and the eNB 2 according to this embodiment can appropriately associate the Msg3 size desired by the UEs 1 supporting the coverage enhancement with the uplink resource allocation for Msg3 transmission by an UL grant within the Msg2 sent from the eNB 2.

For example, it may be applied to light RRC connection discussed by 3GPP. This discussion aims to introduce a new RRC state (or RRC sub-state) between the RRC_Connected state and the RRC_Idle state and to optimize the UE operations (and relevant network operations) in the RRC_Connected state or the RRC_Idle state, thereby achieving reduction of a signaling amount and terminal battery consumption. For example, the operation by the UE 1 of choosing between the full resume ID and the truncated resume ID and the operation by the eNB 2 corresponding to this selecting operation described in the above embodiment may be used to transmit information for state transition between the new RRC state (or RRC sub-state) and the RRC_Connected state or between the RRC_Idle state and the new RRC state (or RRC sub-state) via a Msg3 in the random access procedure.

In some implementations, when the Truncated resume ID transmitted by the UE 1 to resume a suspended RRC connection is lower significant bits (e.g., LSB 25 bits) of the Full resume ID, the eNB 2 may consider the mobility of the UE 1 to allocate the Full resume ID for it. For example, the eNB 2 may configure the Truncated resume IDs of UEs whose mobility is predicated to be low (i.e., the these UEs are less likely to move) and whose CE levels are relatively high (i.e., the number of repetitions is larger when these UEs transmit a signal) such that these truncated resume IDs are distinguished from Truncated resume IDs used by neighboring cells of neighboring eNBs. For example, when the Resume ID consists of a 20-bit eNB ID and a 20-bit UE ID as in the above embodiments, eNB IDs of neighboring eNBs may be configured such that lower 5 bits are not completely identical. In this way, even when the low mobility UE 1 performs cell reselection in response to a change in a radio environment while suspending its RRC connection and then changes its camped cell (or serving cell), it would be more likely to succeed in resuming its RRC connection using the Truncated resume ID.

In some implementations, the Truncated resume ID transmitted by the UE 1 to resume a suspended RRC connection may be other portions (e.g., 25 bits consisting of the 11th to the 35th bits) of the Full resume ID designated by the eNB 2, instead of the LSB 25 bits of the Full resume ID. The eNB 2 transmits to the UE 1 a configuration indicating a portion of the Full resume ID used as the Truncated resume ID (e.g., this configuration indicates a method for selecting the portion from the full resume ID). This configuration may be transmitted via system information (e.g., SIB) or transmitted via dedicated information (e.g., dedicated RRC signaling). Also in this case, for example, the eNB 2 may configure the Truncated resume IDs of UEs whose mobility is predicated to be low (i.e., these UEs are less likely to move) and whose CE levels are relatively high (i.e., the number of repetitions is larger when these UEs transmit a signal) such that these truncated resume IDs are distinguished from Truncated resume IDs used by neighboring cells of neighboring eNBs. Furthermore, the eNB may share this selecting method with a neighboring eNB using X2 SETUP REQUEST/X2 SETUP RESPONSE messages when establishing an X2 connection.

In some implementations, the eNB 2 would fail (or reject) to resume a suspended RRC connection of the UE 1. In this case, the eNB 2 may transmit an RRC Connection Setup message in response to an RRC Connection Resume Request message (e.g., step 309 in FIG. 3). Upon receiving the RRC Connection Setup message, the UE 1 may recognize the failure of the resumption of the RRC connection and transmit an RRC Connection Setup Complete message similar to establishment of a new RRC connection. Hence, the UE 1 can start data transmission without delay by establishing a new RRC connection even if it uses the Truncated resume ID and fails to resume the RRC connection.

Figure 8:
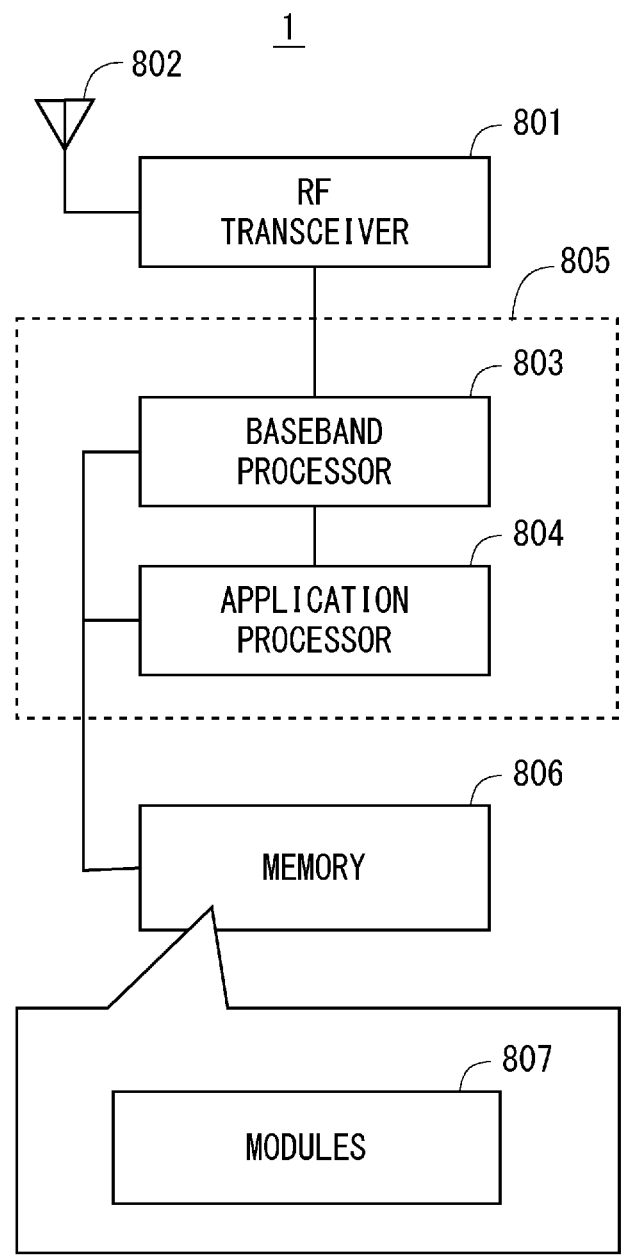
FIG. 8 is a block diagram showing a configuration example of a radio terminal according to some embodiments.

Lastly, configuration examples of the UE 1 and the eNB 2 according to the above embodiments will be described hereinafter. FIG. 8 is a block diagram showing a configuration example of the UE 1. A Radio Frequency (RF) transceiver 801 performs an analog RF signal processing to communicate with the base station 3. The analog RF signal processing performed by the RF transceiver 801 includes a frequency up-conversion, a frequency down-conversion, and amplification. The RF transceiver 801 is coupled to an antenna 802 and a baseband processor 803. That is, the RF transceiver 801 receives modulated symbol data (or OFDM symbol data) from the baseband processor 803, generates a transmission RF signal, and supplies the generated transmission RF signal to the antenna 802. Further, the RF transceiver 801 generates a baseband reception signal based on a reception RF signal received by the antenna 802 and supplies it to the baseband processor 803.

The baseband processor 803 performs digital baseband signal processing (i.e., data-plane processing) and control-plane processing for radio communication. The digital baseband signal processing includes (a) data compression/decompression, (b) data segmentation/concatenation, (c)

composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 803 may include signal processing of the Packet Data Convergence Protocol (PDCP) layer, Radio Link Control (RLC) layer, Medium Access Control (MAC) layer, and Physical (PHY) layer. Meanwhile, the control-plane processing performed by the baseband processor 803 may include processing of the Non-Access Stratum (NAS) protocol, RRC protocol, and MAC Control Elements (MAC CEs).

The baseband processor 803 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 804 described in the following.

The application processor 804 may also be referred to as a CPU, an MPU, a microprocessor, or a processor core. The application processor 804 may include a plurality of processors (or processor cores). The application processor 804 loads a system software program (Operating System (OS)) and various application programs (e.g., voice call application, WEB browser, mailer, camera operation application, and music player application) from a memory 806 or from another memory (not shown) and executes these programs, thereby providing various functions of the UE 1.

In some implementations, as represented by the dashed line (805) in FIG. 8, the baseband processor 803 and the application processor 804 may be integrated on a single chip. In other words, the baseband processor 803 and the application processor 804 may be implemented in a single System on Chip (SoC) device 805. A SoC device may be referred to as a system Large Scale Integration (LSI) or a chipset.

The memory 806 is a volatile memory, a nonvolatile memory, or a combination thereof. The memory 806 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or any combination thereof. For example, the memory 806 may include an external memory device that can be accessed by the baseband processor 803, the application processor 804, and the SoC 805. The memory 806 may include an internal memory device that is integrated in the baseband processor 803, the application processor 804, or the SoC 805. Further, the memory 806 may include a memory disposed in a Universal Integrated Circuit Card (UICC).

The memory 806 may store one or more software modules (or computer programs) including instructions and data for performing processing of the UE 1 described in the above embodiments. In some implementations, the baseband processor 803 or the application processor 804 may be configured to load these software modules from the memory 806 and execute them, thereby performing the processing of the UE 1 described in the above embodiments.

Figure 9:
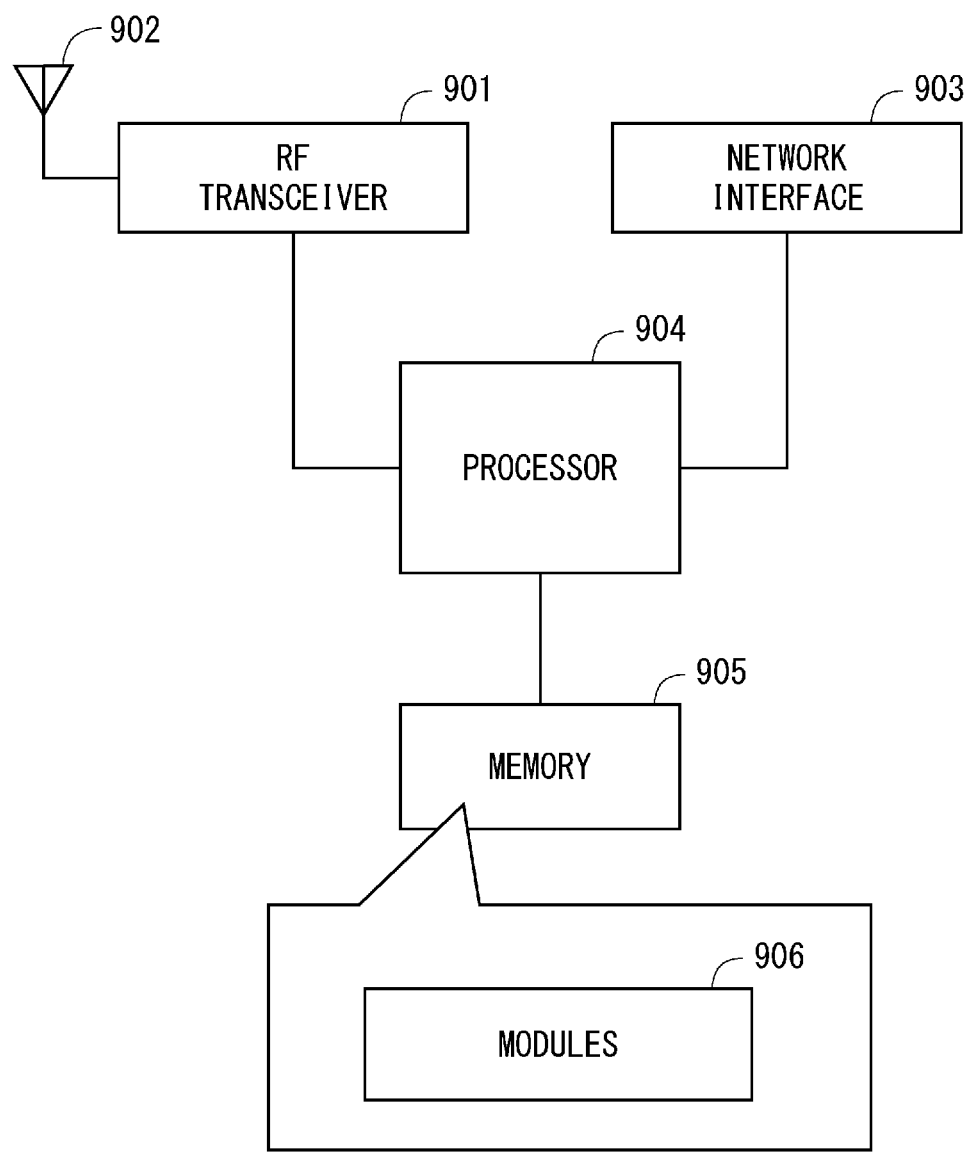
FIG. 9 is a block diagram showing a configuration example of a base station according to some embodiments.

FIG. 9 is a block diagram showing a configuration example of the eNB 2. As shown in FIG. 109, the eNB 2 includes an RF transceiver 901, a network interface 903, a processor 904, and a memory 905. The RF transceiver 901 performs analog RF signal processing to communicate with the UE 1. The RF transceiver 901 may include a plurality of transceivers. The RF transceiver 901 is coupled to an antenna 902 and the processor 904. In some implementations, the RF transceiver 901 receives modulated symbol data (or OFDM symbol data) from the processor 904, generates a transmission RF signal, and supplies the generated transmission RF signal to the antenna 902. Further, the RF transceiver 901 generates a baseband reception signal based on a reception RF signal received by the antenna 902 and supplies this signal to the processor 904.

The network interface 903 is used to communicate with network nodes (e.g., a MME, C-SGN, and an S/P-GW). The network interface 903 may include, for example, a network interface card (NIC) conforming to the IEEE 802.3 series.

The processor 904 performs digital baseband signal processing (i.e., data-plane processing) and control-plane processing for radio communication. For example, in the case of LTE or LTE-Advanced, the digital baseband signal processing performed by the processor 904 may include signal processing of the PDCP layer, RLC layer, MAC layer, and PHY layer. Meanwhile, the control-plane processing performed by the processor 904 may include processing of the S1 protocol, RRC protocol, and MAC CEs.

The processor 904 may include a plurality of processors. For example, the processor 904 may include a modem-processor (e.g., DSP) that performs the digital baseband signal processing, and a protocol-stack-processor (e.g., CPU or MPU) that performs the control-plane processing.

The memory 905 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or any combination thereof. The memory 905 may include a storage located apart from the processor 904. In this case, the processor 904 may access the memory 905 through the network interface 903 or an I/O interface (not shown).

The memory 905 may store one or more software modules (or computer programs) including instructions and data to perform processing of the eNB 2 described in the above embodiments. In some implementations, the processor 904 may be configured to load these software modules from the memory 905 and execute them, thereby performing the processing of the eNB 2 described in the above embodiments.

As described above with reference to FIGS. 8 and 9, each of the processors included in the UE 1 and the eNB 2 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Further, the above-described embodiments are merely examples of applications of the technical ideas obtained by the inventors. These technical ideas are not limited to the above-described embodiments and various modifications may be made thereto.

For example, the whole or part of the embodiments disclosed above can be described as, but not limited to, the following supplementary notes.

(Supplementary Note 1)

A radio terminal comprising:
a memory; and
at least one processor coupled to the memory and configured to:
determine (a) a pathloss level between the radio terminal and a base station, (b) a coverage enhancement level based on the pathloss level, or (c) a coverage enhancement mode configured in the radio terminal; and
choose between non-truncated first information and truncated first information, having a smaller bit length than the non-truncated first information, to be included in an initial uplink Radio Resource Control (RRC) message transmitted within a random access procedure, based on the determined pathloss level, coverage enhancement level, or coverage enhancement mode.

(Supplementary Note 2)

The radio terminal according to Supplementary note 1, wherein the at least one processor is configured to execute a Radio Resource Control (RRC) layer module and a Medium Access Control (MAC) layer module, wherein
the RRC layer module is adapted to choose between the non-truncated first information and the truncated first information to be included in the initial uplink RRC message, based on the determined pathloss level, coverage enhancement level, or coverage enhancement mode,
the RRC layer module is adapted to request the MAC layer module to transmit the initial uplink RRC message, and
the MAC module is adapted to perform the random access procedure in response to a request from the RRC layer module for transmission of the initial uplink RRC message.

(Supplementary Note 3)

The radio terminal according to Supplementary note 2, wherein the at least one processor is configured to perform the random access procedure,
wherein the random access procedure includes:
selecting a resource for random access based on the determined pathloss level, coverage enhancement level, or coverage enhancement mode;
transmitting to the base station a random access preamble in accordance with the selected resource for random access;
receiving from the base station a random access response to the random access preamble; and
transmitting the initial uplink RRC message, which contains one of the non-truncated first information and the truncated first information, using an uplink resource specified by the random access response.

(Supplementary Note 4)

The radio terminal according to any one of Supplementary notes 1 to 3, wherein
the non-truncated first information is a Resume ID that is used for AS context caching and is transmitted to the radio terminal from the base station or another base station,
the truncated first information is a truncated Resume ID derived from the Resume ID, and
the initial uplink RRC message is an RRC Connection Resume Request message.

(Supplementary Note 5)

A method in a radio terminal, the method comprising:
determining (a) a pathloss level between the radio terminal and a base station, (b) a coverage enhancement level based on the pathloss level, or (c) a coverage enhancement mode configured in the radio terminal; and
choosing between non-truncated first information and truncated first information, having a smaller bit length than the non-truncated first information, to be included in an initial uplink Radio Resource Control (RRC) message transmitted within a random access procedure, based on the determined pathloss level, coverage enhancement level, or coverage enhancement mode.

(Supplementary Note 6)

The method according to Supplementary note 5, further comprising executing a Radio Resource Control (RRC) layer module and a Medium Access Control (MAC) layer module, wherein
the RRC layer module is adapted to choose between the non-truncated first information and the truncated first information to be included in the initial uplink RRC message, based on the determined pathloss level, coverage enhancement level, or coverage enhancement mode,
the RRC layer module is adapted to request the MAC layer module to transmit the initial uplink RRC message, and
the MAC module is adapted to perform the random access procedure in response to a request from the RRC layer module for transmission of the initial uplink RRC message.

(Supplementary Note 7)

The method according to Supplementary note 6, wherein the random access procedure includes:
selecting a resource for random access based on the determined pathloss level, coverage enhancement level, or coverage enhancement mode;
transmitting to the base station a random access preamble in accordance with the selected resource for random access;
receiving from the base station a random access response to the random access preamble; and
transmitting the initial uplink RRC message, which contains one of the non-truncated first information and the truncated first information, using an uplink resource specified by the random access response.

(Supplementary Note 8)

The method according to any one of Supplementary notes 5 to 7, wherein
the non-truncated first information is a Resume ID that is used for AS context caching and is transmitted to the radio terminal from the base station or another base station,
the truncated first information is a truncated Resume ID derived from the Resume ID, and the initial uplink RRC message is an RRC Connection Resume Request message.

(Supplementary Note 9)

A program for causing a computer to perform a method according to any one of Supplementary notes 5 to 8.

(Supplementary Note 10)

A base station comprising:

a memory; and at least one processor coupled to the memory and configured to transmit broadcast information in a cell, wherein the broadcast information indicates, which of non-truncated first information and truncated first information having a smaller bit length than the non-truncated first information is to be included in an initial uplink Radio Resource Control (RRC) message transmitted within a random access procedure, (a) per pathloss level between the radio terminal and a base station, (b) per coverage enhancement level based on the pathloss level, or (c) per coverage enhancement mode configured in the radio terminal.

(Supplementary Note 11)

The base station according to Supplementary note 10, wherein the non-truncated first information is a Resume ID that is used for AS context caching and is transmitted to the radio terminal from the base station or another base station, the truncated first information is a truncated Resume ID derived from the Resume ID, and the initial uplink RRC message is an RRC Connection Resume Request message.

(Supplementary Note 12)

The base station according to Supplementary note 10 or 11, wherein the broadcast information includes a random access configuration, wherein the random access configuration includes a preamble grouping configuration that is used to determine, on a per-coverage enhancement level basis, one of the non-truncated first information and the truncated first information to be included in the initial uplink RRC message, and wherein the preamble grouping configuration indicates whether a plurality of random access preambles assigned to each coverage enhancement level are further divided into two or more subsets.

(Supplementary Note 13)

A method in a base station, the method comprising:

generating broadcast information; and transmitting the broadcast information in a cell, wherein the broadcast information indicates, which of non-truncated first information and truncated first information having a smaller bit length than the non-truncated first information is to be included in an initial uplink Radio Resource Control (RRC) message transmitted within a random access procedure, (a) per pathloss level between the radio terminal and a base station, (b) per coverage enhancement level based on the pathloss level, or (c) per coverage enhancement mode configured in the radio terminal.

(Supplementary Note 14)

The method according to Supplementary note 13, wherein the non-truncated first information is a Resume ID that is used for AS context caching and is transmitted to the radio terminal from the base station or another base station, the truncated first information is a truncated Resume ID derived from the Resume ID, and the initial uplink RRC message is an RRC Connection Resume Request message.

(Supplementary Note 15)

The method according to Supplementary note 13 or 14, wherein the broadcast information includes a random access configuration, wherein the random access configuration includes a preamble grouping configuration that is used to determine, on a per-coverage enhancement level basis, one of the non-truncated first information and the truncated first information to be included in the initial uplink RRC message, and wherein the preamble grouping configuration indicates whether a plurality of random access preambles assigned to each coverage enhancement level are further divided into two or more subsets.

(Supplementary Note 16)

A program for causing a computer to perform a method according to any one of Supplementary notes 13 to 15.

REFERENCE SIGNS LIST

1 RADIO TERMINAL (UE)
2 BASE STATION (eNB)
801 RADIO FREQUENCY (RF) TRANSCEIVER
803 BASEBAND PROCESSOR
804 APPLICATION PROCESSOR
806 MEMORY
901 RF TRANSCEIVER
904 PROCESSOR
905 MEMORY

The invention claimed is:

1. A radio terminal comprising:

a memory; and at least one processor coupled to the memory and configured to:

determine (a) a pathloss level between the radio terminal and a base station, (b) a coverage enhancement level based on the pathloss level, or (c) a coverage enhancement mode configured in the radio terminal; and choose between non-truncated first information and truncated first information, having a smaller bit length than the non-truncated first information, to be included in an initial uplink Radio Resource Control (RRC) message transmitted within a random access procedure, based on the determined pathloss level, coverage enhancement level, or coverage enhancement mode.

2. The radio terminal according to claim 1, wherein the at least one processor is configured to execute a Radio Resource Control (RRC) layer module and a Medium Access Control (MAC) layer module, wherein the RRC layer module is adapted to choose between the non-truncated first information and the truncated first information to be included in the initial uplink RRC message, based on the determined pathloss level, coverage enhancement level, or coverage enhancement mode, the RRC layer module is adapted to request the MAC layer module to transmit the initial uplink RRC message, and the MAC module is adapted to perform the random access procedure in response to a request from the RRC layer module for transmission of the initial uplink RRC message.

3. The radio terminal according to claim 2, wherein the at least one processor is configured to perform the random access procedure, wherein the random access procedure includes:

selecting a resource for random access based on the determined pathloss level, coverage enhancement level, or coverage enhancement mode;

transmitting to the base station a random access preamble in accordance with the selected resource for random access;
receiving from the base station a random access response to the random access preamble; and
transmitting the initial uplink RRC message, which contains one of the non-truncated first information and the truncated first information, using an uplink resource specified by the random access response.

4. The radio terminal according to claim 1, wherein
the non-truncated first information is a Resume ID that is used for AS context caching and is transmitted to the radio terminal from the base station or another base station,
the truncated first information is a truncated Resume ID derived from the Resume ID, and
the initial uplink RRC message is an RRC Connection Resume Request message.

5. A method in a radio terminal, the method comprising:
determining (a) a pathloss level between the radio terminal and a base station, (b) a coverage enhancement level based on the pathloss level, or (c) a coverage enhancement mode configured in the radio terminal; and
choosing between non-truncated first information and truncated first information, having a smaller bit length than the non-truncated first information, to be included in an initial uplink Radio Resource Control (RRC) message transmitted within a random access procedure, based on the determined pathloss level, coverage enhancement level, or coverage enhancement mode.

6. The method according to claim 5, further comprising executing a Radio Resource Control (RRC) layer module and a Medium Access Control (MAC) layer module, wherein
the RRC layer module is adapted to choose between the non-truncated first information and the truncated first information to be included in the initial uplink RRC message, based on the determined pathloss level, coverage enhancement level, or coverage enhancement mode,
the RRC layer module is adapted to request the MAC layer module to transmit the initial uplink RRC message, and
the MAC module is adapted to perform the random access procedure in response to a request from the RRC layer module for transmission of the initial uplink RRC message.

7. The method according to claim 6, wherein the random access procedure includes:
selecting a resource for random access based on the determined pathloss level, coverage enhancement level, or coverage enhancement mode;
transmitting to the base station a random access preamble in accordance with the selected resource for random access;
receiving from the base station a random access response to the random access preamble; and
transmitting the initial uplink RRC message, which contains one of the non-truncated first information and the truncated first information, using an uplink resource specified by the random access response.

8. The method according to claim 5, wherein
the non-truncated first information is a Resume ID that is used for AS context caching and is transmitted to the radio terminal from the base station or another base station,
the truncated first information is a truncated Resume ID derived from the Resume ID, and
the initial uplink RRC message is an RRC Connection Resume Request message.

9. A base station comprising:
a memory; and
at least one processor coupled to the memory and configured to transmit broadcast information in a cell, wherein
the broadcast information indicates, which of non-truncated first information and truncated first information having a smaller bit length than the non-truncated first information is to be included in an initial uplink Radio Resource Control (RRC) message transmitted within a random access procedure, (a) per pathloss level between the radio terminal and a base station, (b) per coverage enhancement level based on the pathloss level, or (c) per coverage enhancement mode configured in the radio terminal.

10. The base station according to claim 9, wherein
the non-truncated first information is a Resume ID that is used for AS context caching and is transmitted to the radio terminal from the base station or another base station,
the truncated first information is a truncated Resume ID derived from the Resume ID, and
the initial uplink RRC message is an RRC Connection Resume Request message.

11. The base station according to claim 9, wherein the broadcast information includes a random access configuration,
wherein the random access configuration includes a preamble grouping configuration that is used to determine, on a per-coverage enhancement level basis, one of the non-truncated first information and the truncated first information to be included in the initial uplink RRC message, and
wherein the preamble grouping configuration indicates whether a plurality of random access preambles assigned to each coverage enhancement level are further divided into two or more subsets.

* * * * *